(12) United States Patent
Friend et al.

(10) Patent No.: US 12,170,669 B2
(45) Date of Patent: Dec. 17, 2024

(54) TRUST TOKENS FOR RESOURCE ACCESS

(71) Applicant: Visa International Service Association, San Francisco, CA (US)

(72) Inventors: Erik Christopher Friend, Mountain View, CA (US); Michael Steven Bankston, Oakland, CA (US)

(73) Assignee: Visa International Service Association, San Francisco, CA (US)

( * ) Notice: Subject to any disclaimer, the term of this patent is extended or adjusted under 35 U.S.C. 154(b) by 498 days.

(21) Appl. No.: 17/312,868

(22) PCT Filed: Dec. 10, 2019

(86) PCT No.: PCT/US2019/065521
§ 371 (c)(1),
(2) Date: Jun. 10, 2021

(87) PCT Pub. No.: WO2020/123535
PCT Pub. Date: Jun. 18, 2020

(65) Prior Publication Data
US 2022/0046023 A1     Feb. 10, 2022

Related U.S. Application Data

(60) Provisional application No. 62/778,106, filed on Dec. 11, 2018.

(51) Int. Cl.
*H04L 9/40*     (2022.01)
*G06F 21/32*    (2013.01)
*G06F 21/45*    (2013.01)

(52) U.S. Cl.
CPC .......... *H04L 63/102* (2013.01); *G06F 21/32* (2013.01); *G06F 21/45* (2013.01); *H04L 63/0853* (2013.01); *H04L 63/108* (2013.01)

(58) Field of Classification Search
CPC .................................................. H04L 63/102
See application file for complete search history.

(56) References Cited

U.S. PATENT DOCUMENTS 7,568,092 B1 *   7/2009   Englund .............. G06F 21/335
                                                          713/168
8,595,810 B1    11/2013   Ben Ayed
(Continued)

FOREIGN PATENT DOCUMENTS

CA      2992333 A1     5/2018
JP     2017520033 A    7/2017
(Continued)

OTHER PUBLICATIONS

Indian Application No. 202147030656, First Examination Report mailed on Jan. 12, 2023, 5 pages.
(Continued)

*Primary Examiner* — Ponnoreay Pich
(74) *Attorney, Agent, or Firm* — Kilpatrick Townsend & Stockton LLP

(57) ABSTRACT

A system and method are provided which include receiving, from a first application on a user device, an indication that a user has been authenticated and receiving, from a second application on the user device, an indication that the user is detected. The user device receives the indication that the user is detected from a wearable device on the user. Based on receiving the two indications within a time period, a trust token is generated or maintained for the user.

12 Claims, 6 Drawing Sheets

(56) References Cited

U.S. PATENT DOCUMENTS

| | | | | |
|---|---|---|---|---|
| 9,374,356 | B2* | 6/2016 | Sondhi | H04L 63/20 |
| 9,948,612 | B1* | 4/2018 | Jawahar | H04L 63/0272 |
| 2002/0156879 | A1* | 10/2002 | Delany | H04L 63/102 |
| | | | | 709/229 |
| 2012/0240211 | A1* | 9/2012 | Counterman | H04L 63/0853 |
| | | | | 726/9 |
| 2014/0026193 | A1* | 1/2014 | Saxman | G06F 21/33 |
| | | | | 726/4 |
| 2015/0007299 | A1 | 1/2015 | Grajek et al. | |
| 2015/0310194 | A1* | 10/2015 | Zhang | G06F 21/31 |
| | | | | 726/9 |
| 2016/0065579 | A1* | 3/2016 | Chen | G06F 21/45 |
| | | | | 726/4 |
| 2016/0071343 | A1* | 3/2016 | Agrafioti | H04W 12/068 |
| | | | | 340/5.52 |
| 2016/0094541 | A1* | 3/2016 | Tan | H04L 63/0853 |
| | | | | 713/156 |
| 2016/0366119 | A1 | 12/2016 | Rykowski et al. | |
| 2017/0346851 | A1* | 11/2017 | Drake | H04L 9/0838 |
| 2018/0196510 | A1 | 7/2018 | Liu et al. | |
| 2018/0317085 | A1* | 11/2018 | Gujjar | H04L 63/107 |
| 2018/0359244 | A1* | 12/2018 | Cockerill | H04L 63/12 |
| 2019/0149524 | A1 | 5/2019 | Bankston et al. | |
| 2020/0120094 | A1* | 4/2020 | Jain | H04L 9/3215 |
| 2020/0294045 | A1 | 9/2020 | Howard et al. | |
| 2022/0046023 | A1* | 2/2022 | Friend | H04L 63/107 |

FOREIGN PATENT DOCUMENTS

| | | |
|---|---|---|
| JP | 2017157223 A | 9/2017 |
| JP | 2018147327 A | 9/2018 |
| KR | 10-2014-0121571 A | 10/2014 |
| WO | 2020/117735 | 6/2020 |

OTHER PUBLICATIONS

Supplementary Search Report received Jan. 27, 2022 for EP Application No. 19895498, 7 pages.

International Search Report and Written Opinion as mailed on Apr. 7, 2021 for International Application No. PCT/US2019/065521, 11 pages.

Office Action, mailed Aug. 29, 2023, in Japanese Patent Application No. JP 2021-533228, 5 pages.

First Examination Report, dated Jun. 28, 2024, for Australian Patent Application No. AU2019395366, 3 pages.

Office Action, mailed Jan. 3, 2024, Canadian Patent Application No. CA3, 122,700, 4 pages.

Intention to Grant, dated May 23, 2024, European Patent Application No. EP19895498.4, 8 pages.

Office Action, mailed Feb. 13, 2024, Japanese Patent Application No. JP2021-533228, 5 pages.

Office Action, mailed Sep. 11, 2024, for Canadian Application No. 3,122,700, 4 pages.

Office Action, mailed Sep. 15, 2024, for Chinese Application No. 201980082093.8, 25 pages.

* cited by examiner

TRUST TOKENS FOR RESOURCE ACCESS

CROSS-REFERENCE TO RELATED APPLICATION

This application is a U.S. National Phase Application of International Application No. PCT/US2019/065521, filed Dec. 10, 2019, which claims priority to U.S. Provisional Application No. 62/778,106, filed on Dec. 11, 2018, which are herein incorporated by reference in their entirety.

BACKGROUND

Access to a secure resource may be granted based on one or more authentication methods. For example, a user may log in to a secure website or application. As another example, a user may present credentials or biometrics to gain access to a secure building. The more secure the resource, the more authentication may be required. For instance, a secure resource may require step-up authentication, or multiple forms of identification. As these authentication methods grow more onerous, it may become increasingly burdensome for a user to regain access to the resource. For example, a user may log into a banking website with a user name and password. Then the user may have to perform a step up authentication process by entering an access code received by text message. If the user has to log back in after the session expires, then the user may experience friction in having to undergo the multiple authentication phases once again.

To avoid the need to excessively reauthenticate a user, access to a resource may be prolonged for a time. One way to keep a user logged in to a website is through the use of cookies. Cookies may be issued at the beginning of a session and expire at the end of the session. For instance, a cookie may expire when the user manually logs out and/or after a period of time (e.g., 5 minutes) has elapsed. The use of cookies to extend a session is lacking in security. The cookies are vulnerable to tampering and exposed to multiple entities.

Embodiments address these and other problems, individually and collectively.

BRIEF SUMMARY

The methods described herein provide a way to extend a user's ability to access to a resource securely and using limited computing resources.

Embodiments include a method comprising: receiving, by a server computer from a first application on a user device, an indication that a user has been authenticated; receiving, by the server computer from a second application on the user device, an indication that the user is detected, wherein the user device receives the indication that the user is detected from a wearable device on the user; and based on receiving the two indications within a time period, generating or maintaining a trust token for the user.

In some aspects, the method further includes receiving, by the server computer from the second application on the user device, an indication that the user is not detected; and based on receiving the indication that the user is not detected, revoking the trust token. In some aspects, the method further includes determining, by the server computer, that the user has authorized access to user data associated with a digital identity of the user, wherein the trust token is generated based on the determining that the user has authorized the access to the user data associated with the digital identity of the user. In some aspects, the method further includes determining, by the server computer, that the user has revoked the access to the user data associated with the digital identity of the user; and revoking, by the server computer, the trust token based on determining that the user has revoked the access.

In some aspects, the time period is a first time period, and the user has authorized access to the user data associated with the digital identity of the user for a second time period, the method further comprising: determining, by the server computer, that the second time period has expired; and revoking, by the server computer, the trust token based on determining that the second time period has expired. In some aspects, the method further includes identifying, by the server computer, a digital identity of the user, wherein the trust token is stored in association with the digital identity of the user. In some aspects, the method further includes periodically updating, by the server computer, a record based on periodically received indications that the user is detected, wherein the trust token is maintained based on the record.

In some aspects, the indication that the user is detected corresponds to a detected heartbeat of the user. In some aspects, the method further includes comparing, by the server computer, the detected heartbeat of the user to stored heartbeats of the user; and based on the comparison, determining, by the server computer, that the detected heartbeat matches the stored heartbeats, wherein the trust token is further generated or maintained based on the determination that the detected heartbeat matches the stored heartbeats.

Embodiments include a server computer comprising: a processor; and a computer readable medium, operatively coupled to the processor, for performing a method as described above.

Embodiments include a method comprising: determining, by a user device, that a user has been authenticated; transmitting, by the user device to a server computer, an indication that the user has been authenticated; determining, by the user device, that the user is detected, wherein the user device determines that the user is detected based on information generated by a wearable device based on detecting a heartbeat of the user; and transmitting, by the user device to the server computer, an indication that the user is detected, wherein the server computer generates or maintains a trust token for the user based on receiving the two indications within a time period.

In some aspects, the method further includes receiving, by the user device from the wearable device, an indication that the user is not detected; and transmitting, by the user device to the server computer, the indication that the user is not detected, wherein the trust token is revoked based on the indication that the user is not detected. In some aspects, the method further includes periodically transmitting additional indications that the user is detected, by the user device to the server computer, wherein the additional indications are used to maintain the trust token.

Embodiments include a user device comprising: a processor; and a computer readable medium, operatively coupled to the processor, for performing a method as described above.

DETAILED DESCRIPTION

Figure 1:
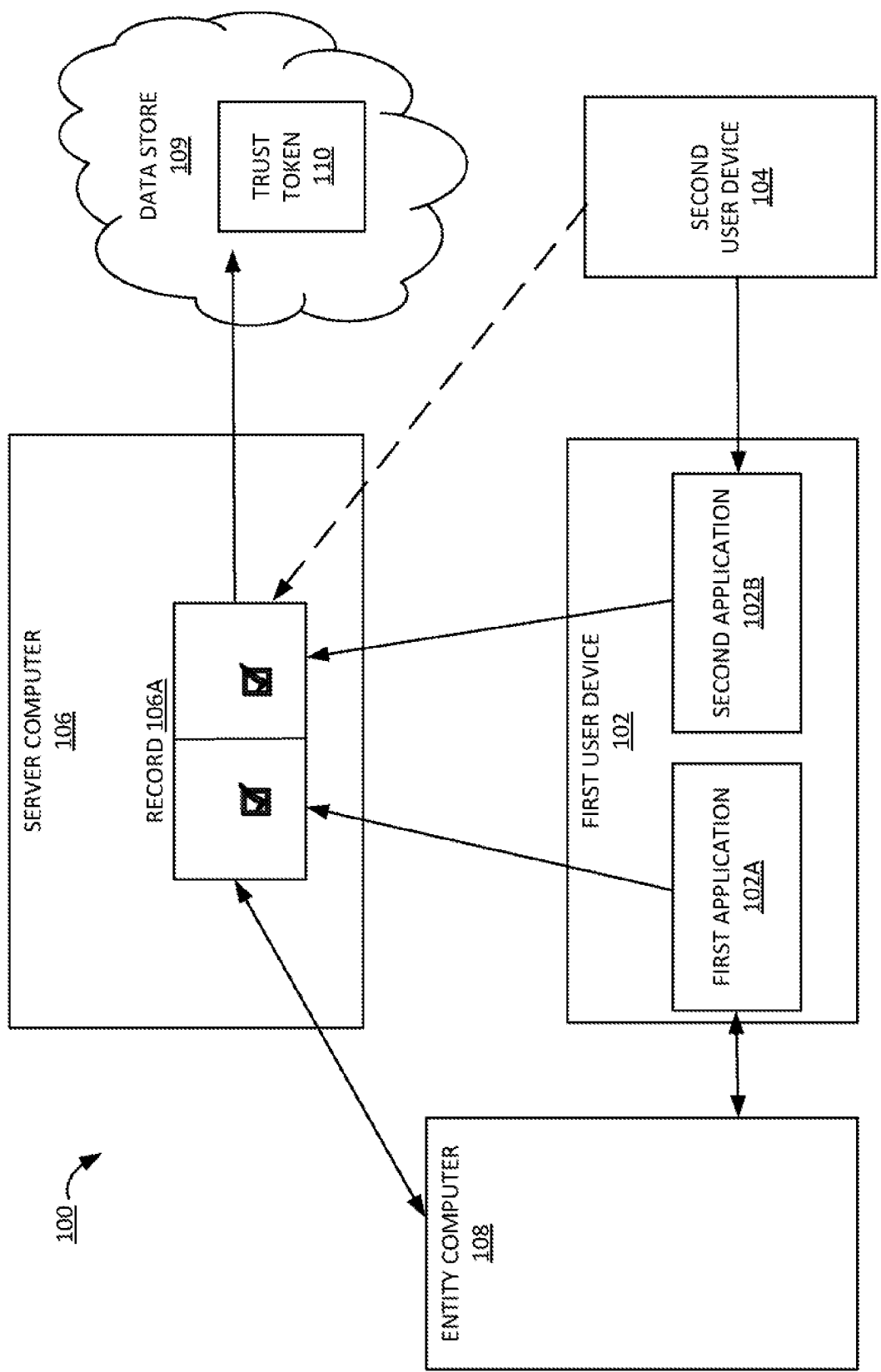
FIG. 1 shows a schematic diagram of a system and method for managing a trust token according to some embodiments.

Prior to discussing various embodiments, some terms can be described in further detail.

A "user" may include an individual. In some embodiments, a user may be associated with one or more personal accounts and/or user devices. The user may also be referred to as a cardholder, account holder, or consumer in some embodiments.

A "user device" may be any suitable device that may be operated by a user. User devices may include cellular phones, personal digital assistants (PDAs), pagers, tablets, personal computers, and the like. As additional examples, user devices may include wearable devices (e.g., watches, rings, etc.). A user device may comprise any suitable hardware and software for performing such functions, and may include multiple devices or components.

A "resource provider" may be an entity that can provide a resource such as goods, services, information, and/or access. Examples of resource providers includes merchants, data providers, transit agencies, governmental entities, venue and dwelling operators, etc. A resource provider may operate a resource provider computer.

The term "authentication" and its derivatives may refer to a process by which the credential of an endpoint (including but not limited to applications, people, devices, processes, and systems) can be verified to ensure that the endpoint is who they are declared to be.

The term "identifier" may refer to any information that may be used to identify something. In some embodiments, the identifier may be a special value generated randomly or according to a predetermined algorithm, code, or shared secret. For example, an individual may be identified using a driver's license number or a cryptographic key. In some embodiments, the identifier may be in the form of one or more graphics, a token, a bar code, a quick response (QR) code, or any other information that may be used to uniquely identify an entity.

An "identity attribute" may refer to a particular piece of information about an entity (e.g., person, organization, thing, or the like). Examples of identity attributes include a social security number, an age, a phone number, and a bank account number associated with a person.

A "digital identity" (DI) may include a secure set of information about an entity (e.g., a person, organization, or thing). A DI may comprise a plurality of identity attributes, as well as a digital identity identifier that identifies the digital identity. For example, a DI for a user, Joe Smith, may include identity attributes such as the user's date of birth, social security number, address, and driver's license number, as well as an identifier such as Joe_Smith_1234 which is used to identify Joe Smith's digital identity. The DI may be made available to another entity in a secure manner. DIs may rely on agreements among stakeholders and security measures such as cryptography.

A "trust token" may include an indicator that can be used to grant access to a resource. A trust token may be used, for example, to extend a period in which a user remains authenticated to a secure system. The trust token may be stored to a data store, such as a cloud storage system, managed by a server computer. The trust token may be binary, or may include encoded information. The trust token may include or be stored in association with additional information such as a user identifier, entity identifier, timestamp, digital identity, and so forth. In some embodiments, the trust token may be viewable by one or more entities for determining whether to grant access to one or more respective resources. The data store may store multiple trust tokens, each in association with a particular user and/or entity. For example, a trust token may be stored in association with a user identifier for a user that has been authenticated and an entity identifier for an entity to which the user has been authenticated.

An "access device" may be any suitable device for obtaining access to a resource. An access device may generally be located in any suitable location, such as at the location of a merchant. An access device may be in any suitable form. Some examples of access devices include point of sale (POS) devices, cellular phones, personal digital assistants (PDAs), personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a portable device.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer-readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

Embodiments provide a trust token which may be used for granting a user access to a resource. The trust token may be generated when confirmation is received from two applications within a time period. For example, the first application may transmit a notification that the user has undergone an authentication process (e.g., via step-up authentication on a banking website, via a retinal scan to gain access to a secure location, etc.). The second application may transmit an indication that the user is wearing a wearable device and that the wearable device detects a heartbeat of the user. If both notifications are received within a threshold time period, then a server computer may issue a trust token indicating that the user is trusted and can be granted access to a resource. For example, the trust token may keep the user logged-in to a banking website without step-up for a time or allow the user to gain access to the secure location without doing another retinal scan for a time. Alternatively, or additionally, the user may be granted access to other resources during the time period.

FIG. 1 shows a schematic diagram of a system and method for managing a trust token according to some embodiments. The system 100 may include a server computer 106, a first user device 102, a second user device 104, an entity computer 108, and a data store 109.

The components in the system depicted in FIG. 1 can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

For simplicity of illustration, a certain number of components are shown in FIG. 1. It is understood, however, that embodiments may include more than one of each component. For example, there can be a plurality of user devices, including first user device 102, in operative communication with the entity computer 108 and/or the server computer 106.

The first user device 102 may be a device operable by a user and capable of executing applications. As examples, the first user device 102 may be a smartphone, a computer, a tablet, or the like. The first user device 102 may execute various applications. Components and functionalities of an example user device such as first user device 102 are further described below with respect to FIG. 3.

The entity computer 108 may be a server computer associated with an entity such as a resource provider. The entity computer 108 may be associated with a same entity that manages the first application 102A. For example, the first application 102A is a banking application and the entity computer 108 is a server computer of a corresponding bank. As another example, the first application 102A is merchant application (e.g., for online shopping) and the entity computer 108 is a server computer of a corresponding merchant. As another example, the first application 102A is a transit application (e.g., for controlling access to a transit system) and the entity computer 108 is a server computer of a corresponding transit agency.

The second user device 104 may be device capable of detecting a user. The second user device may be a wearable device, such as a smartwatch, optical head-mounted display, smart ring, or the like. Alternatively, the second user device may be another type of device capable of detecting a user. For example, a mobile phone may detect user motion via haptics. As another example, one or more surveillance cameras may be used detect a user. The second user device 104 may include functionality to detect a heartbeat (e.g., based on a detected pulse). The second user device 104 may include functionality to monitor characteristics of a heartbeat over time. The second user device 104 may include functionality to detect and/or monitor a pulse or other data about the user wearing the device. The second user device 104 may be communicatively coupled to the first user device 102 and/or the server computer 106. The second user device 104 may include functionality to notify an application on the first user device 102 when a user is detected (or no longer detected). Alternatively, or additionally, the second user device 104 may include functionality to notify the server computer 106 when a user is detected (or no longer detected).

The applications executing on the first user device 102 may include a first application 102A. First application 102A may include functionality to authenticate a user. For example, first application 102A may be a banking application. The banking application may prompt the user to enter a password, personal identification number (PIN), biometric data, or the like. This data may then be used to authenticate the user. As another example, first application 102A may be an application for starting a vehicle keylessly. Prior to activating the vehicle keylessly at some initial time, the application may require the user to authenticate using biometrics, passwords, or the like.

First application 102A may further include functionality to communicate with a server computer 106. First application 102A may transmit a notification to the server computer 106 indicating that the user has been authenticated.

The applications executing on the first user device 102 may include a second application 102B. Second application 102B may include functionality to communicate with a second user device 104 (e.g., to transmit and/or receive messages as to whether the user is detected). In some embodiments, the second application 102B may receive raw data (e.g., pulse rates) from the second user device 104, and analyze the raw data to determine whether the user is detected. Second application 102B may include functionality to communicate with a server computer 106 (e.g., to transmit and/or receive messages as to whether the user is detected).

In some embodiments, the first application 102A and the second application 102B may be unable to communicate with one another directly. For example, on a smartphone, applications may be walled off from one another for security purposes. The first application 102A and the second application 102B may be partially or completely prevented from direct communication with each other. Hence, as a work-around, one application may transmit information to a server computer and the server computer may transmit information back to the other application. Alternatively, if the applications can communicate directly, some of the operations described herein with respect to the server computer may be executed on the first user device 102.

The server computer 106 may include functionality to generate and manage trust tokens. In some embodiments, the server computer 106 may generate a trust token based on a record 106A. Further detail about a server computer such as server computer 106 is described in further detail below with respect to FIG. 2. The server computer 106 may store trust tokens 110 in a data store 109 (e.g., cloud storage), as further described below with respect to FIG. 2.

Record 106A may be used to control access to a resource based on multiple conditions. Record 106A may also be referred to as a semaphore, in that record 106A may represent synchronization of two or more processes. Record 106A may be represented as a variable, object, or the like. Record 106A may be used to determine whether two affirmative indications have been received within a time period. As shown in FIG. 1, record 106A is affirmative (as denoted by the two checkboxes) if the user is (a) authenticated and (b) detected (e.g., with a heartbeat, pulse, surveillance system, etc.). Record 106A be represented as affirmative, for example, by being assigned a value of 1 or yes. Record 106A may be represented as negative (e.g. the user is not authenticated and/or not detected), for example, by being assigned a value of 0 or no.

In some embodiments, record 106A may be affirmative if the user is authenticated and detected within a time period. For example, the user is detected within one second of authentication. As another example, the user is continually detected for a thirty-second window surrounding the time of authentication. The server computer 106 may use a timer to determine whether the user is detected for a particular time period. Record 106A may be modified to no longer be affirmative if the user is not detected. If record 106A is affirmative, then the system may generate a trust token 110.

The trust token 110 may be an indicator established based on record 106A. The trust token 110 may be used to indicate that the user should be granted access to a resource, as further detailed below with respect to FIG. 6. The trust token 110 may be stored to data store 109, such as a cloud storage system, managed by server computer 106. The trust token 110 may include or be stored in association with additional information such as a user identifier, entity identifier, timestamp, digital identity, and so forth. In some embodiments, the trust token 110 may be viewable by one or more entities for determining whether to grant access to one or more respective resources.

The trust token 110 may be revoked if the user is not detected for a threshold time period. The threshold time period may, as examples, be 30 seconds, 30 minutes, or 2 hours. As a specific example, while short periods of not detecting a user heartbeat may be permitted, if a user heartbeat is not detected for 1 hour or longer, then the trust token may be revoked.

Figure 2:
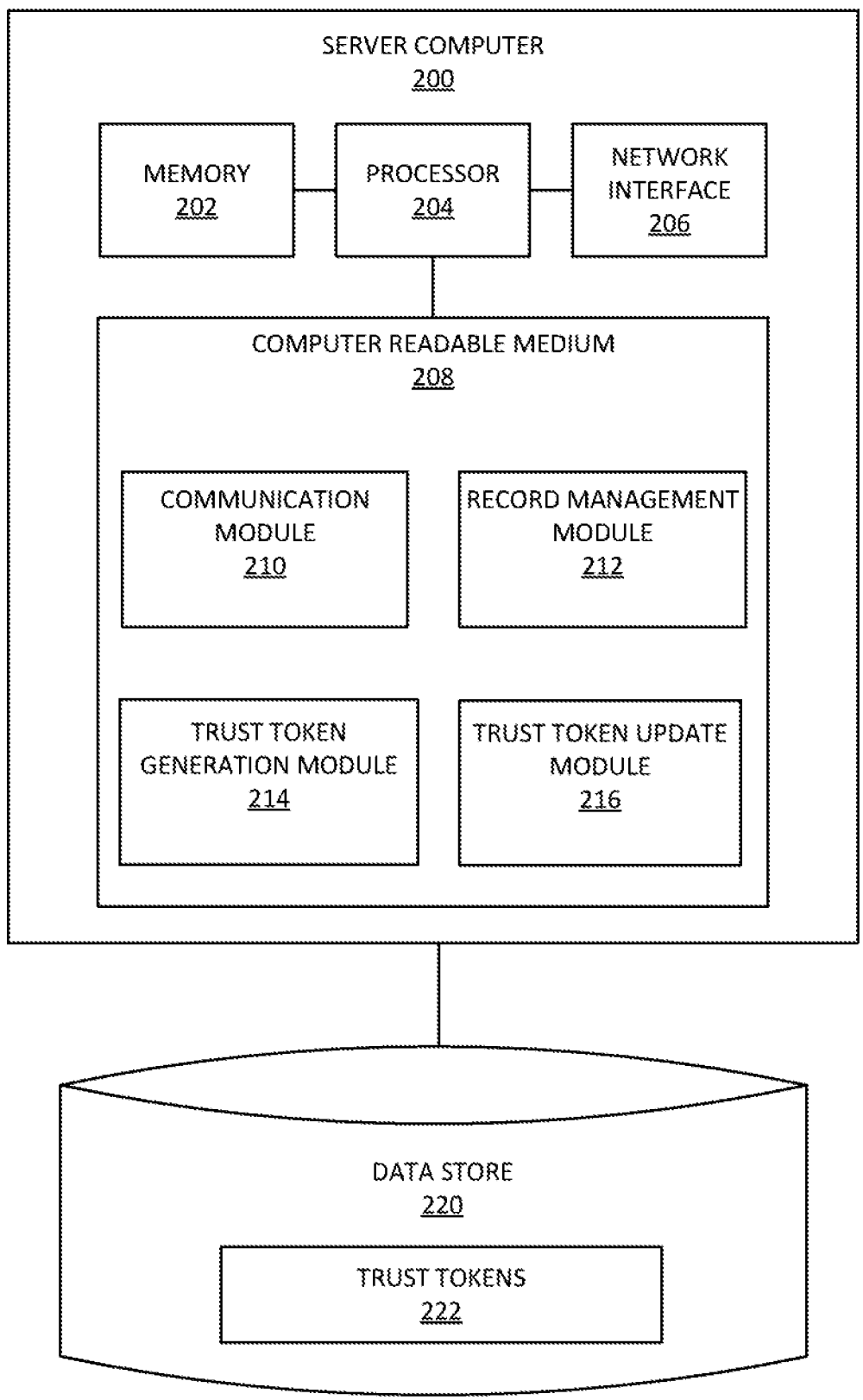
FIG. 2 shows a block diagram of a server computer according to some embodiments.

FIG. 2 shows a block diagram of a server computer 200 according to some embodiments. The server computer 200 may comprise a processor 204. The processor 204 may be coupled to a memory 202, a network interface 206, and a computer-readable medium 208. Server computer 200 may include, or be communicatively coupled to, a data store 220.

The data store 220 may be a storage unit and/or device (e.g., a file system, database, collection of tables, or other storage mechanism) for storing data. The data store 220 may include multiple different storage units and/or devices. For example, the data store 220 may be a cloud storage system accessible by one or more entity computers on a limited basis (e.g., access may be controlled by cryptographic keys managed by the server computer 200, as further described below with respect to FIG. 4).

The data store 220 may store trust tokens 222. As described above with respect to FIG. 1, a trust token may be used to extend an authentication period for a user based on a record. The data store 220 may store a plurality of trust tokens 222, each in association with a particular user and/or entity. For example, a trust token 222 may be stored in association with a user identifier for a user that has been authenticated and an entity identifier for an entity to which the user has been authenticated. A trust token 222 may be stored in association with a digital identity of the user.

The processor 204 may be implemented as one or more integrated circuits (e.g., one or more single core or multicore microprocessors and/or microcontrollers). The processor 204 may be used to control the operation of the server computer 200. The processor 204 can execute a variety of programs in response to program code or computer-readable code stored in memory. The processor 204 may include functionality to maintain multiple concurrently executing programs or processes.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The network interface 206 may include an interface that can allow the server computer 200 to communicate with external computers. Network interface 206 may enable the server computer 200 to communicate data to and from another device (e.g., entity computer 108, authorizing computer, etc.). Some examples of network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 206 may include Wi-Fi™. Data transferred via network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium. The network interface 206 can utilize a long range communication channel as well as a short range communication channel.

The computer-readable medium 208 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

The computer-readable medium 208 may comprise software code stored as a series of instructions or commands. The computer-readable medium 208 may comprise code, executable by the processor 204, to implement a method comprising: receiving, by a server computer from a first application on a user device, an indication that a user has been authenticated; receiving, by the server computer from a second application on the user device, an indication that the user is detected, wherein the user device receives the indication that the user is detected from a wearable device on the user; and based on receiving the two indications within a time period, generating or maintaining a trust token for the user.

The computer-readable medium 208 may include a communication module 210, a record management module 212, a trust token generation module 214, and a trust token update module 216. Each of these modules may include code configured to perform the functions described below in conjunction with the processor 204.

The communication module 210 may comprise code that causes the processor 204 to generate messages, forward messages, reformat messages, and/or otherwise communicate with other entities.

The record management module 212 may comprise code that causes the processor 204 to generate and maintain records. Record management module 212 may, in cooperation with processor 204, generate a record (e.g., record 106A, described above with respect to FIG. 1) based on information received from a user device. Record management module 212 may, in cooperation with processor 204 and communication module 210, receive an indication from a user device specifying user authentication status (e.g., a user recently logged in to a secure application on the user device). Record management module 212 may, in cooperation with processor 204 and communication module 210, receive an indication from a user device specifying user detection status (e.g., a user heartbeat is detected by an application coupled to a wearable device). Based on such information, the record management module 212 may, in cooperation with processor 204, update the record. The record management module 212 may further provide information about the record to the trust token generation module 214 and/or the trust token update module 216.

The trust token generation module 214 may comprise code that causes the processor 204 to generate a trust token. Trust token generation module 214 may, in cooperation with processor 204 and record management module 212, monitor a record (e.g., record 106A, described above with respect to FIG. 1). If the record is affirmative (e.g., a user is authenticated and detected within a time period) then the trust token generation module 214 may generate a trust token 222 in cooperation with processor 204. The trust token generation module may include code that causes processor 204 to generate trust token 222 by generating and storing the trust token 222 to the data store 220 in association with a particular user.

The trust token update module 216 may comprise code that causes the processor 204 to update a trust token 222. Trust token update module 216 may, in cooperation with processor 204, monitor a record (e.g., record 106A, described above with respect to FIG. 1). If the record changes, then the trust token update module 216 may, in cooperation with processor 204, update the trust token 222. For example, if the record changes from affirmative to negative, then the trust token update module 216 may revoke a trust token 222 in cooperation with processor 204. Revoking a trust token 222 may include deleting the trust token 222 or modifying the trust token 222 to indicate that the trust token 222 is currently invalid. If the record changes from negative to affirmative, then the trust token update module 216 may reinstate a trust token 222 in cooperation with processor 204. Reinstating a trust token 222 may include generating a new trust token 222 based on a prior trust token 222 that was revoked, or modifying an invalid trust token 222 to indicate that the trust token 222 is currently valid. The trust token update module 216 may, in cooperation with processor 204, execute actions to maintain a trust token (e.g., by keeping the trust token 222 stored and/or updating a time stored in association with the trust token 222).

The server computer 200 may further include one or more timers (not pictured). The timers may be software timers and/or hardware timers. The server computer 200 may use the timers to track the various time periods described above. For example, the server computer 200 may start a timer when a user has been authenticated, and, if the timer has a count of less than ten seconds when the server computer 200 confirms that the user has been detected, the server computer 200 may proceed to generate a trust token 222. As another example, the server computer 200 may start a timer when a user has been authenticated, and, if the timer reaches ten days, take the user off the grid.

Figure 3:
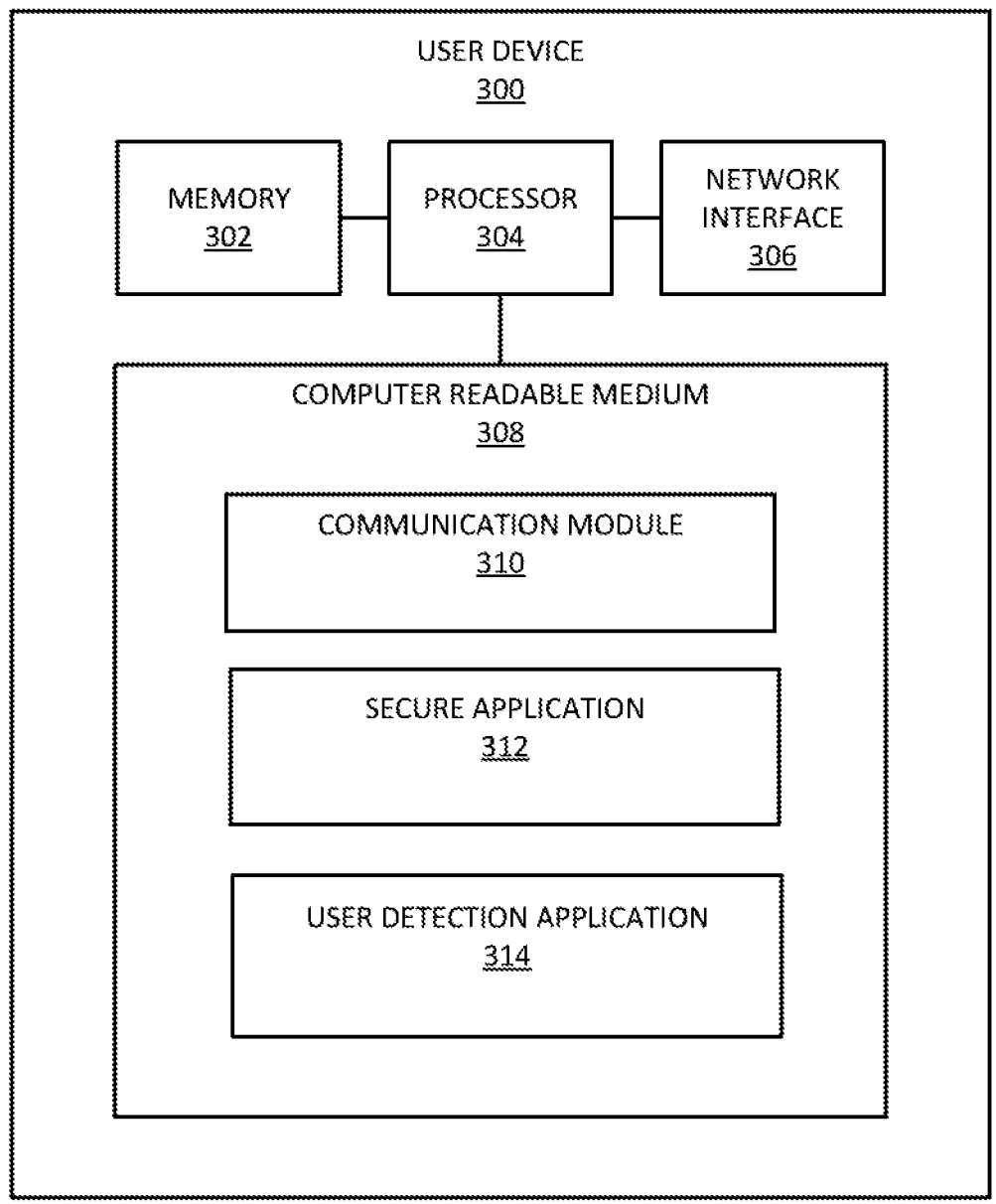
FIG. 3 shows a block diagram of a user device according to some embodiments.

FIG. 3 shows a block diagram of a user device 300 according to some embodiments. The user device 300 may comprise a processor 304. The processor 304 may be coupled to a memory 302, a network interface 306, and a computer-readable medium 308.

The memory 302, processor 304, and network interface 306 may be substantially similar to the memory 202, processor 204, and network interface 306, as described above with respect to FIG. 2.

The computer-readable medium 308 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

The computer-readable medium 308 may comprise software code stored as a series of instructions or commands. The computer-readable medium 308 may comprise code, executable by the processor 304, to implement a method comprising: determining, by a user device, that a user has been authenticated; transmitting, by the user device to a server computer, an indication that the user has been authenticated; determining, by the user device, that the user is detected, wherein the user device determines that the user is detected based on information generated by a wearable device based on detecting a heartbeat of the user; and transmitting, by the user device to the server computer, an indication that the user is detected, wherein the server computer generates or maintains a trust token for the user based on receiving the two indications within a time period.

The computer-readable medium 308 may include a communication module 310, a secure application 312, and a user detection application 314. Each of these modules may include code configured to perform the functions described below in conjunction with the processor 304.

The communication module 310 may comprise code that causes the processor 304 to generate messages, forward messages, reformat messages, and/or otherwise communicate with other entities.

The secure application 312 may comprise code that causes the processor 304 to authenticate a user. The secure application 312 may be substantially similar to the first application 102A described above with respect to FIG. 1. The secure application 312 may be an application to which a user should be authenticated on an ongoing basis, such as a banking application, an application for starting a vehicle keylessly, or an application for logging into a secure file system.

The user detection application 314 may comprise code that causes the processor 304 to communicate information about whether a user is detected. The user detection application 314 may be substantially similar to the second application 1026 described above with respect to FIG. 1. The user detection application 314 may, for example, be an application associated with a wearable device such as a smartwatch. The user detection application 314 may retrieve, analyze, and transmit information received from a wearable device.

Figure 4:
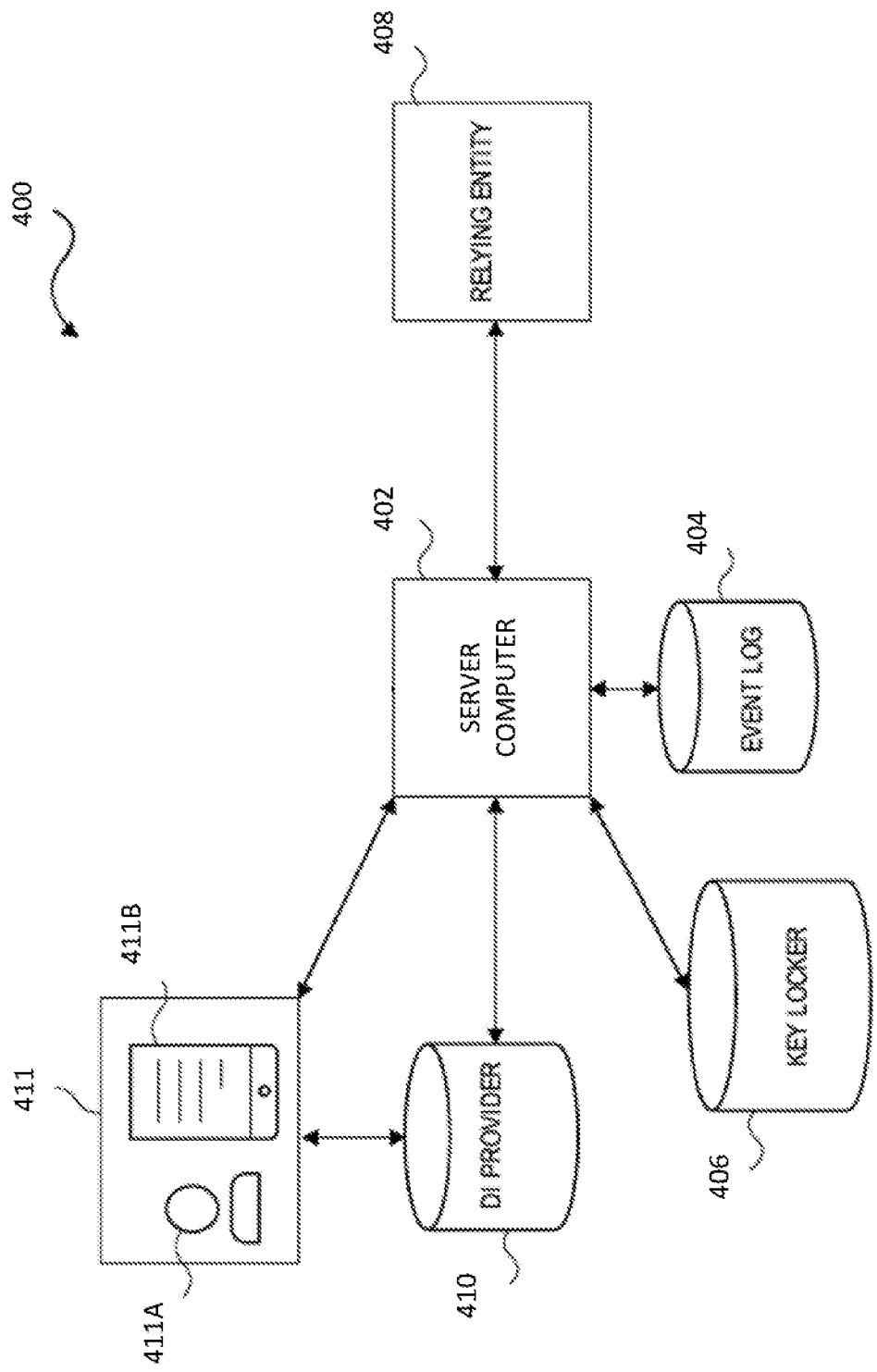
FIG. 4 shows a block diagram of a digital identity platform according to some embodiments.

FIG. 4 illustrates a schematic diagram of an example system 400 for digital identity management according to some embodiments. As will be explained below, the digital identity management system 400 can be used in conjunction with the previously described trust token system to both protect sensitive user information as well as make it convenient for the user to conduct interactions such as payment transactions. System 400 illustrates only one of many possible arrangements of components configured to execute the programming described herein. Other arrangements may include fewer or different components, and the division of work between the components may vary depending on the arrangement.

The system 400 can include at least one digital identity (DI) provider 410, a server computer 402, a relying entity 408, an event log 404, a target entity 411, and a key locker 406. The components of the system 400 may be in operative communication with each other through a communication network.

The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 4 may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

In some embodiments, the target entity 411 is an entity for which a digital identity is provided (i.e., the digital identity about the target entity 411). The target entity 411 may include a user 411A and/or a client device 411B of the target entity. The term "target entity" may refer to an individual (e.g., a customer, a consumer, and/or the like), a business or other legal organization, a government agency, and/or the like. Additionally or alternatively, the term "target entity" may refer to a thing (e.g., an object, a piece of equipment, an electronic component, a computer system, and/or the like).

In some non-limiting embodiments, the target entity 411 may be assigned an identifier ("an identifier of the target entity"). The identifier of the target entity may include data associated with a digital signature and/or cryptographic key of the target entity 411. Alternatively, or additionally, the identifier of the target entity may include an ID number, a Quick Response (QR) code, and/or the like.

Information about a target entity can be retrieved from sources. One type of source is a DI provider 410. A DI provider 410 generates one or more digital identities (DIs) associated with a target entity 111. As described above, a DI can include data associated with a set of information about an entity that can be shared with another entity. The DI provider 410 may be an issuer, an acquirer, a transaction service provider, a government agency, and/or the like. The DI provider 410 is configured to create and store DIs.

In some non-limiting embodiments, the relying entity 408 is an entity to receive information associated with a digital identity of a user. In some embodiments, the relying entity 408 may correspond to the entity computer 108, described above with respect to FIG. 1. The relying entity 408 can be any entity requesting information about the target entity 411. For example, the relying entity 408 can be a merchant requesting information about a target entity 411 initiating a payment transaction. Additionally or alternatively, the relying entity 408 can be an entity (e.g., a government agency or business organization) requesting information about the target entity 411 with respect to a non-payment interaction (e.g., granting the target entity 411 access to a secured area or event venue).

In some non-limiting embodiments, the relying entity 408 may be assigned an identifier ("an identifier of the relying entity"). The identifier of the relying entity may include data associated with a digital signature and/or cryptographic key of the relying entity 408.

The event log 404 may be used to access event metadata for tasks such as dispute resolution, fraud detection, and/or analysis of user behaviors. By restricting access to the cryptographic keys needed to access one or more events, the event structure helps to keep data associated with a target entity private. For example, a private key held by a target entity may be required to access event data, ensuring that event data is only available with explicit permission from the target entity. Access paths to the event data may be defined via a common Application Programming Interface (API) structure. The access paths may be established such that limited entities may access the events with limited amounts of data.

The event log 404 can be stored in any suitable computer-readable storage medium and/or any suitable combination of computer-readable storage media. For example, the event log 404 can be stored in a database. Additionally or alternatively, the event log 404 can be maintained and stored in a distributed ledger, including but not limited to a blockchain and/or the like.

The system 400 may further include a key locker 406. The key locker 406 may be a be a file, a collection of files, or a database for storing cryptographic keys. The key locker 406 may be cloud-based. The key locker 406 may store cryptographic keys assigned to various entities (e.g., a cryptographic key assigned to a target entity 411, a DI provider 410, a relying entity 408, etc.). The key locker 406 may organize the keys based on target entity 411, such that the keys of parties that have been involved in events in association with a target entity 411 are stored in a structure based on that target entity 411. This set of keys may be encrypted using a key of the target entity 411, such that a private key held by the target entity 411 is required to release the set of keys. Alternatively, or additionally, a pairwise key set may be assigned for each relationship. As an example, a pairwise key set may be assigned for the target entity 411 and the relying entity 408. The key locker 406 may store cryptographic keys that have been associated with prior events involving the target entity 411.

In some embodiments, one or more of the keys may encoded based on the Base58 model. Base58 is a type of binary-to-text encoding using fifty-eight easily distinguished alphanumeric symbols and a payload of arbitrary size. Additionally, one or more keys may be encoded in Wallet Import Format (WIF). WIF is a method of encoding a key which facilitates copying the key and allows for compression. Some keys may or may not be encoded and/or encrypted based on the appropriate security level.

The system 400 may manage an "on the grid" status. "On the grid" may include being connected to and in communication with a computer network infrastructure. On the grid status may indicate that the user has authorized access to user data associated with a digital identity of the user. For example, being on the grid may include being connected to a network communication system. When a user device is connected to the network communication system, other devices can communicate with the user device in order to access information about the user, such as a digital identity, user data, and the like. For example, a device can communicate with the user device to retrieve a cryptographic key from the user device, which is then used to decrypt an assertion about the user. In embodiments, a user may be authenticated before they go "on the grid." In some embodiments, a user authentication status may be monitored while "on the grid" in order to stay "on the grid." Further details regarding this aspect can be found in PCT Application No. PCT/US2019/064132, filed on Dec. 3, 2019, which is assigned to the same assignee as the present application.

An application, such as a mobile application, may be used for going on and off the grid. For example, an application may include a user interface to indicate on the grid status. A user interface may represent that a user is on the grid in a first state and that the user is off the grid in a second state. The user interface may include a graphical element which can represent and/or control whether the user is on the grid or off the grid. As another example, a user may interact with a checkbox or other element for accepting user input, via a website, to control on the grid status.

To go on the grid, a user may first perform authentication operations and go on the grid. A timer with time left before going off the grid may then be initialized at its maximum value, such as 8 hours.

While a user is on the grid, user data may be associated with a digital identity of the user may be accessible to one or more relying entities. For example, the user data may be event data associated with the user. The user data may be in encrypted form, and may be stored in a database such as the event log 404.

While a user is on the grid, the server computer 402 may grant access to secure event data. The server computer 402 can retrieve a cryptographic key associated with the user from a secure element on a user device associated with the user (e.g., first user device 102 of FIG. 1). Before retrieving the cryptographic key, the server computer 402 can determine that the user data request occurs during the time period during which the user has authorized access to the user data. For example, the server computer 402 can determine that the time stamp of the access request occurs within the time period when the user has authorized access to the user data by various parties. The server computer 402 may use the cryptographic key of the user to access key locker 406. A first time period may be used to control a record (e.g., record 106A of FIG. 1), and another second time period may be used to control on the grid status.

At any point after going on the grid, a user may decide to go off the grid. The user may also be prevented from staying on the grid indefinitely. In some embodiments, a timer may initialize when a user goes on the grid. After the timer expires, the user may be taken off the grid. For example, after authenticating and going on the grid, a user may have 8 hours (e.g., the second time period) before being taken off the grid. The length of timer may be a tunable system parameter. After being taken off the grid, the user may re-authenticate themselves to go back on the grid.

Figure 5:
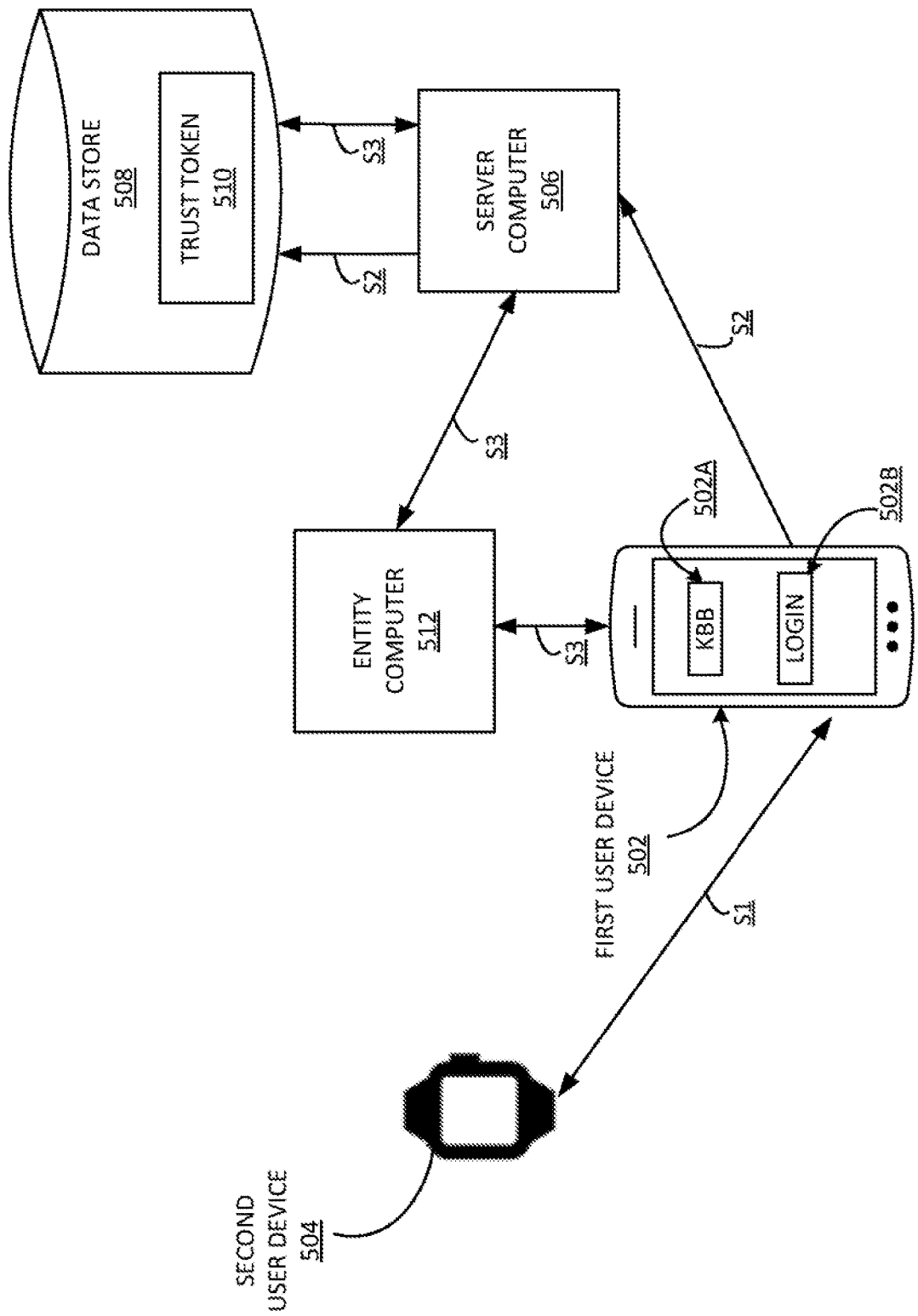
FIG. 5 shows an example use case of using a trust token according to some embodiments.

FIG. 5 shows an example use case of conducting a transaction using a trust token. In this example, the trust token is used to keep a user logged in to a banking application.

At step S1, a second user device 504 (e.g., a wearable device including hardware and software for detecting a heartbeat) synchronizes with a secure application 502A executing on a first user device. The second user device 504 and the secure application 502A may synchronize by confirming user activity substantially simultaneously (e.g., by transmitting indications that the user is authenticated and detected within a period of several seconds). In this example, the first user device is a mobile device, and may be substantially similar to the user device 300 described above with respect to FIG. 3. The secure application 502A is a banking application (e.g., for KBB Bank, as shown in FIG. 5), and may be substantially similar to the secure application 312 described above with respect to FIG. 3.

The first user device 502 may receive user login information from a user via interface element 502B of secure application 502A. The first user device 502 may transmit the login information to a remote entity computer 512 associated with the secure application 502A (e.g., the entity computer 512 may be a server computer of the bank that provides the secure application 502A). The entity computer 512 may transmit authentication confirmation to the first user device 502. The first user device 502 may, in turn, transmit a signal to server computer 506 indicating that the user has been authenticated in step S2.

The server computer 506 may be substantially similar to the server computer 200, described above with respect to FIG. 2. The synchronization of the second user device 504 and the secure application 502A may be performed via the server computer 506. For example, the second user device 504 and the secure application 502A may each ping the server computer 506, and the synchronization may occur on the server computer 506. The server computer may use a record (e.g., record 106A of FIG. 1) to represent such a synchronization.

At step S2, server computer 506 issues a trust token 510 and stores the trust token 510 in data store 508, in response to receiving the signals indicating that the user has been authenticated and detected. Data store 508 may be a cloud storage system (e.g., "the cloud"), and may be substantially similar to data store 220, described above with respect to FIG. 2. Trust token 510 may be substantially similar to trust token 222, described above with respect to FIG. 2. The trust token 510 may be generated based on detecting an affirmative record, as described above with respect to FIG. 1. Alternatively, or additionally, the trust token 222 may be generated based on determining that the user is on the grid. For example, as a precursor to generating trust token 222, the server computer 506 may determine whether the user is on the grid using the digital identity platform described above with respect to FIG. 4. The trust token 222 may also be generated based on detecting the user via the wearable device. The continued detection of the user via the second user device 504 may enable the trust token 222 to be maintained over time.

At step S3, the trust token 510 in the cloud is used to determine whether to grant the user access to a resource. The trust token 510 can streamline the user experience. The user may, for example, be permitted to initiate a fund transfer via secure application 502A without re-authenticating herself or entering her payment credentials. For example, the trust token 510 can be used to avoid the need for the user to authenticate herself by entering information such as a one-time password. The trust token 510, in conjunction with a digital identity, can be advantageously used to avoid the need to enter sensitive data such as personally identifiable information.

Figure 6:
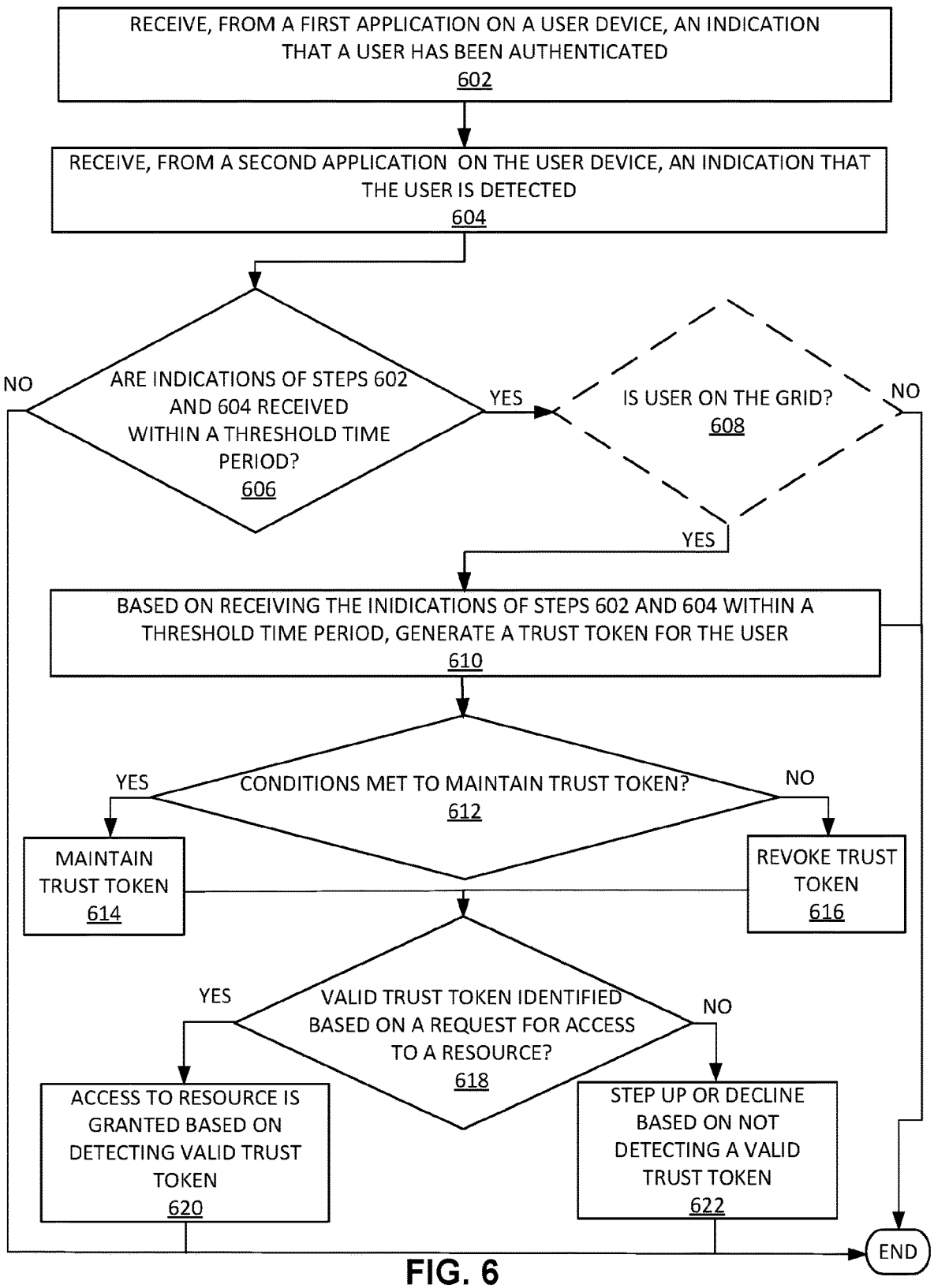
FIG. 6 shows a flow chart of techniques for granting access to a resource using a trust token according to some embodiments.

FIG. 6 shows a flow chart of a method 600 for controlling access to a resource using a trust token according to some embodiments. The operations of FIG. 6 may be performed by the systems described above with respect to FIGS. 1-3, and in particular, the server computer.

At step 602, the server computer may receive, from a first application on a user device, an indication that a user has been authenticated. The first application and/or a remote entity computer associated with the first application may authenticate the user, for example, by accepting and validating the user's login credentials. Login credentials may be supplemented with additional layers of authentication, such as via metadata on the user device and/or step-up authentication. Alternatively, or additionally, the first application may forward an indication of the user being authenticated which was received from an external access device. For example, the user may scan his phone and two forms of identification into an access device upon entering a secure facility for a first time. The access device may, in conjunction with a connected entity device, authenticate the user and transmit a notification thereof to the first application. In any event, the server computer may receive an indication that the user has been authenticated via a message transmitted over a network to the server computer. The message may further include a timestamp indicating a time at which the user was authenticated.

At step 604, the server computer may receive, from a second application executing on the user device, an indication that the user is detected. The user device may receive the indication that the user is detected from a wearable device on the user. As an example, the user device may be in communication with a wearable device (e.g., second user device 104 of FIG. 1) worn by the user. The wearable device may detect a heartbeat and continually or periodically notify an application on the user device (e.g., second application 102B of FIG. 1) that the user's heartbeat is detected. The wearable device may be leveraged to assure that the user is alive and well and wearing the wearable device in a substantially continuous fashion.

In some embodiments, as a heightened security measure, the wearable device and/or associated application on the user device may analyze the detected heartbeat. For example, the user device may analyze the pattern and continuity of the heartbeat to assure it matches that of the authorized user, based on collected historical data associated with the user's heartbeat. The historical data may correspond to stored heartbeats of the user. The system may perform a comparison of such stored heartbeats of the user to a detected heartbeat. The user device may analyze the characteristics of the stored and detected heartbeat data to determine whether the user is awake, and/or whether the detected heartbeat includes characteristic patterns associated with the user. Determining that the user is awake may be an additional requisite before indicating that the user is detected. Alternatively, or additionally, the user may be detected according to pulse, haptics, video recordings, etc. In any event, the server computer may receive an indication that the user is detected via a message transmitted over a network to the server computer. The message may further include a timestamp indicating a time at which the user is detected.

At step 606, the server computer may determine whether the indications of steps 602 and 604 are received within a threshold period of time. The server computer may compare the timestamp indicating the time at which the user was authenticated to the timestamp indicating the time at which the user was detected (e.g., by subtracting the two timestamps to identify the time period that elapsed between receiving the two indications). The server computer may identify a predetermined threshold period of time. The server computer may store threshold periods for different contexts. For example, the server computer may store threshold periods for generating trust tokens, for maintaining trust tokens, and/or for different entities (e.g. a banking application may require a shorter time window than a merchant application). For the purposes of generating a trust token, the threshold time period may, for example, be 1 second. The server computer may determine that the indications of steps 602 and 604 are received within the threshold time period ("yes" result) if the difference between the timestamps is less than or equal to the threshold value. The server computer may determine that the indications of steps 602 and 604 are not received within the threshold time period ("no" result) if the difference between the timestamps is greater than the threshold value.

If the indications are not received within the threshold time period, then the server computer may refrain from generating a trust token, and the flow may end. If the indications are received within the threshold time period, then the flow may optionally proceed to step 608, or, alternatively, directly to step 610.

At step 608, the server computer may optionally determine whether the user is on the grid (e.g., whether the user's digital identity is turned on). The server computer may identify whether the user is on the grid based on a record stored to a digital identity platform, as described above with respect to FIG. 4. Being on the grid may indicate that the user has authorized access to user data associated with a digital identity of the user. In some cases, the user may authorize such access for a time period (e.g., by going "on the grid" for one day). A user may go "off the grid" by revoking the access to the user data associated with the digital identity of the user. If the user is on the grid, then the flow may proceed to step 610. If the user is not on the grid, then the flow may end.

At step 610, the server computer may generate a trust token for the user. The server computer may generate the trust token based on receiving the indications at steps 602 and 604 within the threshold time period. For example, the trust token may be issued if the user's heartbeat is detected within ten seconds of the time the user authenticates via the first application. The server computer may use the stored record to determine whether to generate the trust token, as described above with respect to FIG. 1.

At step 612, the server computer may continually or periodically determine whether conditions are met to maintain the trust token for the user. Determining whether to maintain the trust token may be performed in a similar fashion to determining whether to generate a trust token, e.g., by repeating steps 604-608. In addition to the initial indications used for generating the trust token, the user device may periodically transmit additional indications that the user is detected (or not detected) to the server computer. The additional indications may be used to determine whether to maintain the trust token. For example, the server computer may receive an indication that the user is detected every 30 seconds from the user device, and, based on the indication, update the record. Updating the record may include changing the record, refraining from changing the record, or altering the record in indicate that the heartbeat is or is not detected at a particular time.

The server computer may determine to maintain the trust token based on receiving the indications at steps 602 and 604 within a threshold time period. The threshold time period for maintaining the trust token may be different from the threshold time period for generating the trust token. For example, the server computer may determine that the conditions are met for maintaining the trust token if the user's heartbeat is detected within four hours of the time the user authenticates via the first application, whereas the threshold time period for generating the trust token may be much shorter. The server computer may use the stored record to determine whether the conditions are met to maintain the trust token, as described above with respect to FIG. 1. The conditions for maintaining the trust token may further be based on whether the user is on the grid, as described above with respect to step 608. Accordingly, the server computer may maintain the trust token based on determining that the user has granted access to the user's digital identity or revoke the trust token based on determining that user has revoked access to the user's digital identity. The server computer may further revoke the trust token if a time period associated with remaining on the grid has elapsed.

At step 614, the server computer may maintain the trust token. The server computer may maintain the trust token upon determining "yes" at step 612. Maintaining the trust token may include not revoking the trust token. Alternatively, or additionally, maintaining the trust token may involve actively updating the trust token status (e.g., to active as of a particular time).

At step 616, the server computer may revoke the trust token. The server computer may revoke the trust token upon determining "no" at step 612. Revoking the trust token may include deleting the trust token. Alternatively, revoking the trust token may involve updating the trust token status (e.g., to inactive as of a particular time). As an example, the server computer may receive, from the second application on the user device, an indication that the user is not detected. The user may have removed the wearable device, separated the wearable device from the user device for an excessive time period, or even died. Based on receiving the indication that the user is not detected, the server computer may revoke the trust token.

At step 618, the server computer may identify, or permit an entity computer to identify, the trust token. The trust token may be identified based on a request for access to a resource. For example, the user may, via an application on the user device and/or the entity computer, attempt to make a purchase, transfer funds, remain logged in to a secure website or application, access a secure location, and so forth. Accessing the resource may require the user to be authenticated. Accordingly, a determination is made whether the trust token is in a valid state so that the user may remain authenticated via the trust token. In some embodiments, the entity may transmit an authentication request message to the server computer, and the server computer may retrieve the trust token based on information in the authentication request message. Alternatively, or additionally, the server computer may allow the entity to access the trust token. For example, the server computer may grant the entity access to a cryptographic key that the entity can use to retrieve the trust token. In some embodiments, identifying the trust token may include identifying a digital identity of the user, wherein the trust token is stored in association with the digital identity of the user.

The server computer and/or the entity computer may analyze the identified trust token to determine whether the trust token is valid. The trust token may be valid if the trust token is present in the cloud and invalid if the trust token is not present in the cloud. Alternatively, or additionally, the trust token may be valid if the trust token has a particular value (e.g., valid or 1), and invalid if the trust token has another value (e.g., invalid or 0).

At step 620, access to the resource may be granted based on identifying a valid trust token at step 618. The trust token may be used to assure an entity that the user is authenticated and behaving in a normal fashion, i.e., should remain authenticated. The entity computer may, based on the valid trust token, grant access to the resource requested. For example, the entity computer may allow the user to transfer funds, purchase goods and services, enter a secure location, and so forth.

As one example, access to a resource may be granted by an entity associated with the application that originally authenticated the user. This is somewhat analogous to the situation where a user login is prolonged by use of a cookie. However, in this case, the trust token is more secure and can be used to grant access based on the original authentication for a longer time. The user may authenticate to log in to a banking website. The user may stay logged in, avoiding the need to re-authenticate, so long as the trust token remains valid (e.g., so long as the user's heartbeat is detected via the wearable device).

As another example, the access may be granted by one or more entities distinct from the application that originally authenticated the user. For example, based on authentication information retrieved from a trusted application (e.g., a secure banking application) in conjunction with substantially continuous heart rate confirmation, a different entity may permit the user to receive access to a resource. The different entity may be, for example, a social media application, a merchant website, or the like. Multiple different entities may grant the user access to resources so long as the trust token remains valid. The different entities and resources may be managed using a digital identity of the user. The digital identity may be used to manage events associated with the user. By way of this detailed information about the user, the system can identify resources which the user could access by way of a valid trust token.

As another example, the access may be granted to a transit service based on the trust token. A user may purchase a weekly pass to a subway and scan in identification to authenticate himself in conjunction with the pass when initially riding the subway with the pass. So long as the user is detected by his wearable device, he may be able to reenter the subway system using the trust token.

In some embodiments, the trust token may be acceptable to grant access to a resource in limited circumstances. As an example, the trust token may allow a user to make a purchase without further input for transactions up to $100. If the transaction amount exceeds $100, the user may be prompted for additional information. The trust token may be stored in association with configuration data (e.g., monetary limits or time limits) to enforce such restrictions. As another example, the trust token may allow a user to gain access to a secure facility for 24 hours. After 24 hours, the trust token is revoked and the user must reauthenticate.

At step 622, step up or decline may be performed based on not detecting a valid trust token at step S618. For example, if the trust token has been revoked, the user may be prompted to sign in again, or to step-up via confirming a code number transmitted to the user. Alternatively, or additionally, access to the resource may be declined (e.g., if the user fails step-up authentication).

Embodiments provide several advantages. Friction on the user is reduced by limiting the number of times the user must reauthenticate to access one or more resources. Further, the use of a trust token can facilitate a secure means of determining when access should be granted. Unlike a cookie, which is vulnerable to tampering, a trust token may be managed so as to be safe from tampering. For example, the trust token may be cryptographically secured and only accessible by trusted entities under controlled conditions. Further, the use of a trust token in conjunction with a digital identity can be used to grant a user access to a resource without compromising the user's personally identifiable information, thus preserving user privacy.

Use of a trust token to maintain authentication may further reduce processing resources and time required to determine whether to grant access to a resource. The user need not repeatedly log in or step-up, eliminating or greatly reducing the messaging and processing required to perform such functions. Further, the trust token can be maintained with lower processing requirements than some prior techniques of extending user authentication. By monitoring the user via a single vital parameter such as heart rate, the status of the trust token can be managed with a simple data set. This can reduce the amount of computing power required to make a determination whether to grant access to the resource (in contrast, for example, to tracking user behaviors, which can be quite complex).

Any of the software components or functions described in this application, may be implemented as software code to be executed by a processor using any suitable computer language such as, for example, Java, C++ or Perl using, for example, object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a server computer, from a first application on a user device, an indication that a user has been authenticated;
   receiving, by the server computer, from a second application on the user device, an indication that the user is detected, wherein the user device receives the indication that the user is detected from a wearable device on the user,
   determining, by the server computer, that the user has authorized access to user data associated with a digital identity of the user, wherein the user data associated with the digital identity of the user comprises one or more of a date of birth, social security number, or address;
   based on receiving the two indications within a time period and the determining that the user has authorized the access to the user data associated with the digital identity of the user, generating or maintaining a trust token for the user, wherein the trust token is stored in association with the digital identity of the user and used to extend a period in which the user remains authenticated to a secure system;
   receiving, by the server computer, from the second application on the user device, an indication that the user is not detected;
   based on receiving the indication that the user is not detected, revoking the trust token;
   based at least on receiving a second indication that the user has been authenticated and a second indication that the user is detected, generating a second trust token for the user;
   determining, by the server computer, that the user has revoked the access to the user data associated with the digital identity of the user; and
   revoking, by the server computer, the second trust token based on determining that the user has revoked the access.

2. The method of claim 1, wherein the time period is a first time period, and wherein the user has authorized access to the user data associated with the digital identity of the user for a second time period, the method further comprising:
   based at least on receiving a third indication that the user has been authenticated and a third indication that the user is detected, generating, by the server computer, a third trust token for the user;
   determining, by the server computer, that the second time period has expired; and
   revoking, by the server computer, the third trust token based on determining that the second time period has expired.

3. The method of claim 1 further comprising:
   identifying, by the server computer, the digital identity of the user.

4. The method of claim 1, further comprising:
   periodically updating, by the server computer, a record based on periodically received indications that the user is detected, wherein the trust token is maintained based on the record.

5. The method of claim 1, wherein:
   the indication that the user is detected corresponds to a detected heartbeat of the user.

6. The method of claim 5, further comprising:
   comparing, by the server computer, the detected heartbeat of the user to stored heartbeats of the user; and
   based on the comparison, determining, by the server computer, that the detected heartbeat matches the stored heartbeats, wherein the trust token is further generated or maintained based on the determination that the detected heartbeat matches the stored heartbeats.

7. A server computer comprising:
a processor, and
a computer readable medium, operatively coupled to the processor, for performing a method comprising:
receiving, from a first application on a user device, an indication that a user has been authenticated;
receiving, from a second application on the user device, an indication that the user is detected, wherein the user device receives the indication that the user is detected from a wearable device on the user;
determining that the user has authorized access to user data associated with a digital identity of the user, wherein the user data associated with the digital identity of the user comprises one or more of a date of birth, social security number, or address;
based on receiving the two indications within a time period and the determining that the user has authorized the access to the user data associated with the digital identity of the user, generating or maintaining a trust token for the user, wherein the trust token is stored in association with the digital identity of the user and used to extend a period in which the user remains authenticated to a secure system;
receiving, from the second application on the user device, an indication that the user is not detected;
based on receiving the indication that the user is not detected, revoking the trust token;
based at least on receiving a second indication that the user has been authenticated and a second indication that the user is detected, generating a second trust token for the user;
determining that the user has revoked the access to the user data associated with the digital identity of the user; and
revoking the second trust token based on determining that the user has revoked the access.

8. The server computer of claim 7, wherein the time period is a first time period, and wherein the user has authorized access to the user data associated with the digital identity of the user for a second time period, the method further comprising:
based at least on receiving a third indication that the user has been authenticated and a third indication that the user is detected, generating a third trust token for the user;
determining, by the server computer, that the second time period has expired; and
revoking, by the server computer, the third trust token based on determining that the second time period has expired.

9. The server computer of claim 7, the method further comprising:
periodically updating a record based on periodically received indications that the user is detected, wherein the trust token is maintained based on the record.

10. The server computer of claim 7,
wherein the indication that the user is detected corresponds to a detected heartbeat of the user;
the method further comprising:
comparing the detected heartbeat of the user to stored heartbeats of the user; and
based on the comparison, determining that the detected heartbeat matches the stored heartbeats, wherein the trust token is further generated or maintained based on the determination that the detected heartbeat matches the stored heartbeats.

11. A method comprising:
determining, by a user device, that a user has been authenticated; transmitting, by the user device to a server computer, an indication that the user has been authenticated;
determining, by the user device, that the user is detected, wherein the user device determines that the user is detected based on information generated by a wearable device based on detecting a heartbeat of the user;
transmitting, by the user device to the server computer, an indication that the user is detected,
wherein the server computer determines that the user has authorized access to user data associated with a digital identity of the user, wherein the user data associated with the digital identity of the user comprises one or more of a date of birth, social security number, or address, and generates or maintains a trust token for the user based on receiving the two indications within a time period and the determining that the user has authorized the access to the user data associated with the digital identity of the user, wherein the trust token is stored in association with the digital identity of the user and used to extend a period in which the user remains authenticated to a secure system;
receiving, by the user device from the wearable device, an indication that the user is not detected; and
transmitting, by the user device to the server computer, the indication that the user is not detected, wherein the trust token is revoked based on the indication that the user is not detected,
wherein the server computer thereafter generates a second trust token for the user, determines that the user has revoked the access to the user data associated with the digital identity of the user, and revokes the second trust token based on determining that the user has revoked the access.

12. The method of claim 11, further comprising:
periodically transmitting additional indications that the user is detected, by the user device to the server computer, wherein the additional indications are used to maintain the trust token.

* * * * *